(12) United States Patent
Eberlein

(10) Patent No.: US 9,120,497 B2
(45) Date of Patent: Sep. 1, 2015

(54) SHOPPING TROLLEY

(76) Inventor: Martin Eberlein, Kammeltal (DE)

( * ) Notice: Subject to any disclaimer, the term of this patent is extended or adjusted under 35 U.S.C. 154(b) by 0 days.

(21) Appl. No.: 14/003,365

(22) PCT Filed: Mar. 6, 2012

(86) PCT No.: PCT/DE2012/000238
§ 371 (c)(1),
(2), (4) Date: Sep. 5, 2013

(87) PCT Pub. No.: WO2012/119592
PCT Pub. Date: Sep. 13, 2012

(65) Prior Publication Data
US 2013/0334780 A1    Dec. 19, 2013

(30) Foreign Application Priority Data

Mar. 10, 2011    (DE) .................... 20 2011 003 780 U

(51) Int. Cl.
*B62B 3/14*    (2006.01)
*B62B 1/00*    (2006.01)
*B62B 3/02*    (2006.01)

(52) U.S. Cl.
CPC ................ *B62B 1/006* (2013.01); *B62B 3/027* (2013.01); *B62B 3/1404* (2013.01); *B62B 3/1488* (2013.01); *B62B 3/1492* (2013.01); *B62B 3/14* (2013.01)

(58) Field of Classification Search
CPC .... B62B 3/14; B62B 2202/26; B62B 3/1492; B62B 3/18; B62B 1/266; B62B 3/1488; B62B 3/1496
USPC ............. 280/33.991, 33.992, 33.997, 33.998, 280/DIG. 4, 47.34, 47.35; D34/17
See application file for complete search history.

(56) References Cited

U.S. PATENT DOCUMENTS

| 2,596,686 | A | 5/1952 | Hess |
| D172,269 | S | * 5/1954 | Dahlberg .................... D12/130 |

(Continued)

FOREIGN PATENT DOCUMENTS

| DE | 20 2010 013061 U1 | 3/2011 |
| WO | WO-93/01077 A1 | 1/1993 |

OTHER PUBLICATIONS

International Search Report (in German with English translation) for PCT/DE2012/000238, mailed Aug. 13, 2012/ ISA/EP.

*Primary Examiner* — Brodie Follman
*Assistant Examiner* — Emma K Frick
(74) *Attorney, Agent, or Firm* — Harness, Dickey & Pierce, P.L.C.

(57) ABSTRACT

The invention relates to a shopping trolley which is stackable with similar trolleys, having a chassis, having a holding unit which is connected to the chassis, and having a pushing unit located at the rear, wherein the chassis has two curved longitudinal supports leading from the rear side castors to the front side castors of the shopping trolley. The two longitudinal supports, proceeding from their rear end section, extend upward and toward the front and subsequently, inclined downward toward the front, are continued to the front end section such that at least the intermediate section, or the intermediate section and the end section, of each longitudinal support belongs to either of two geometrical planes which, proceeding from the plane of travel of the castors, extend from bottom to top. The invention is characterized in that the front end sections are led out of the planes extending from bottom to top.

11 Claims, 3 Drawing Sheets

(56) References Cited

U.S. PATENT DOCUMENTS

| | | | |
|---|---|---|---|
| 3,027,174 A | 3/1962 | Garbarino | |
| 3,083,978 A * | 4/1963 | Foster | 280/47.34 |
| 3,844,577 A * | 10/1974 | Wahl | 280/33.991 |
| 4,084,832 A * | 4/1978 | Upshaw | 280/33.997 |
| 4,335,892 A * | 6/1982 | Berlin | 280/33.991 |
| 4,519,622 A * | 5/1985 | Levy-Joseph | 280/33.997 |
| 4,647,055 A * | 3/1987 | Weill | 280/33.992 |
| 5,618,055 A * | 4/1997 | Mulholland | 280/641 |
| 5,700,021 A * | 12/1997 | Leatherbury et al. | 280/47.35 |
| 6,203,053 B1 * | 3/2001 | Sohrt et al. | 280/641 |
| D444,281 S * | 6/2001 | Gaze et al. | D34/19 |
| 6,626,446 B1 * | 9/2003 | Yosef | 280/47.38 |
| 2005/0275178 A1* | 12/2005 | Huesdash et al. | 280/47.35 |
| 2008/0211200 A1* | 9/2008 | Eberlein | 280/33.991 |
| 2009/0230643 A1* | 9/2009 | Eckert et al. | 280/33.998 |

\* cited by examiner

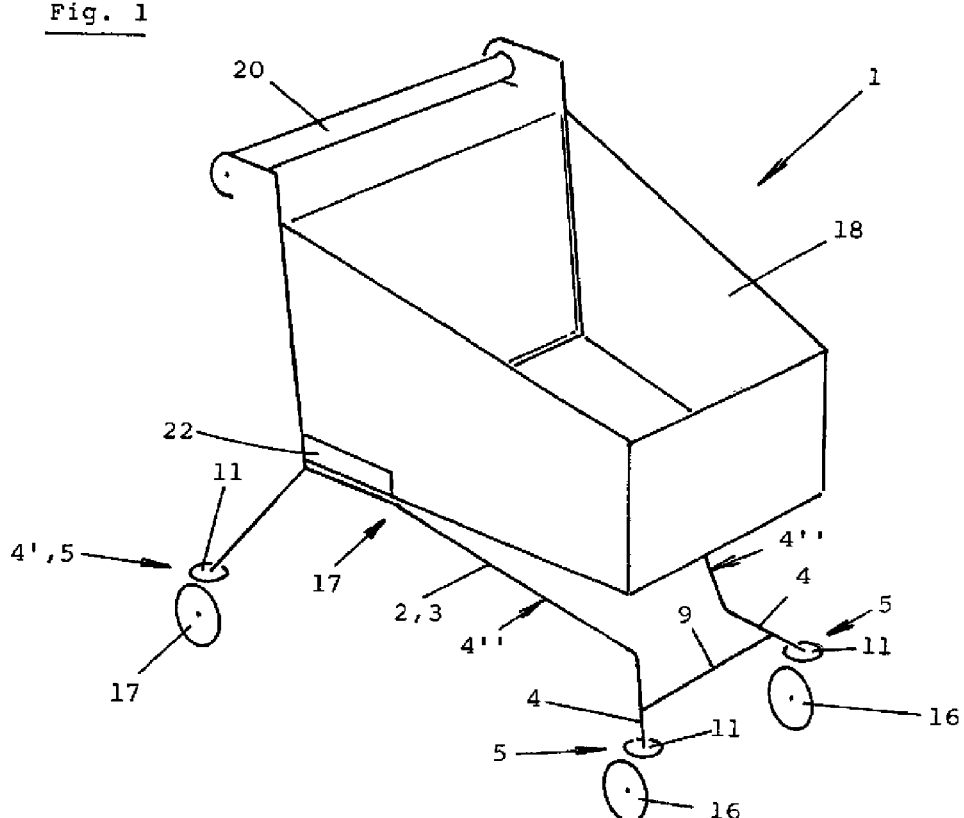
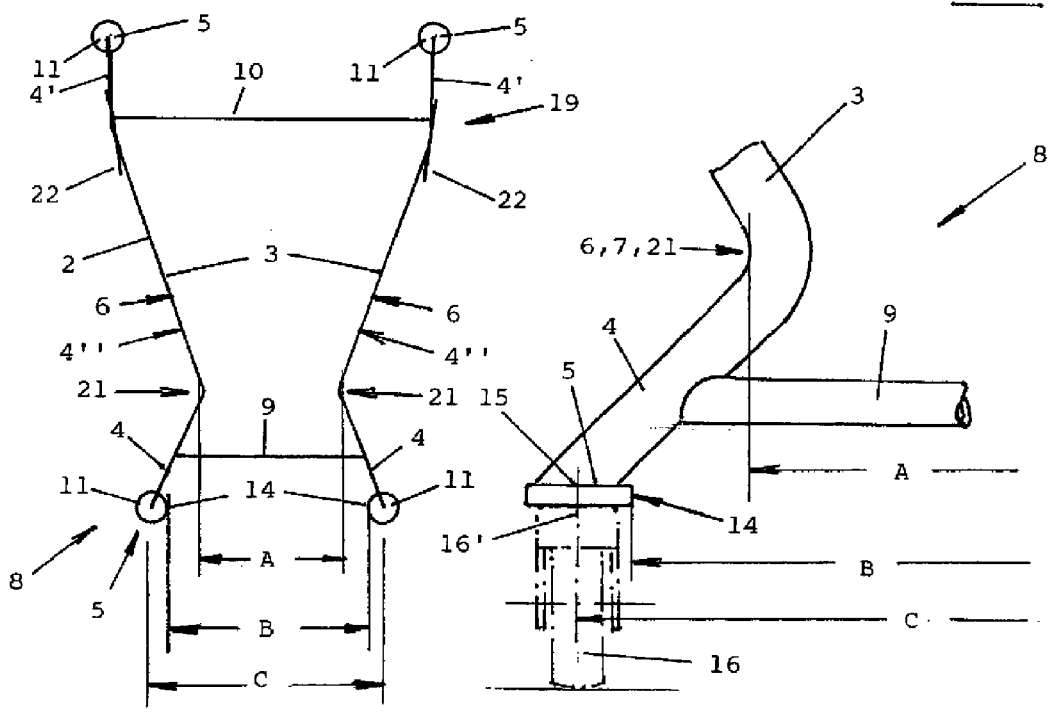

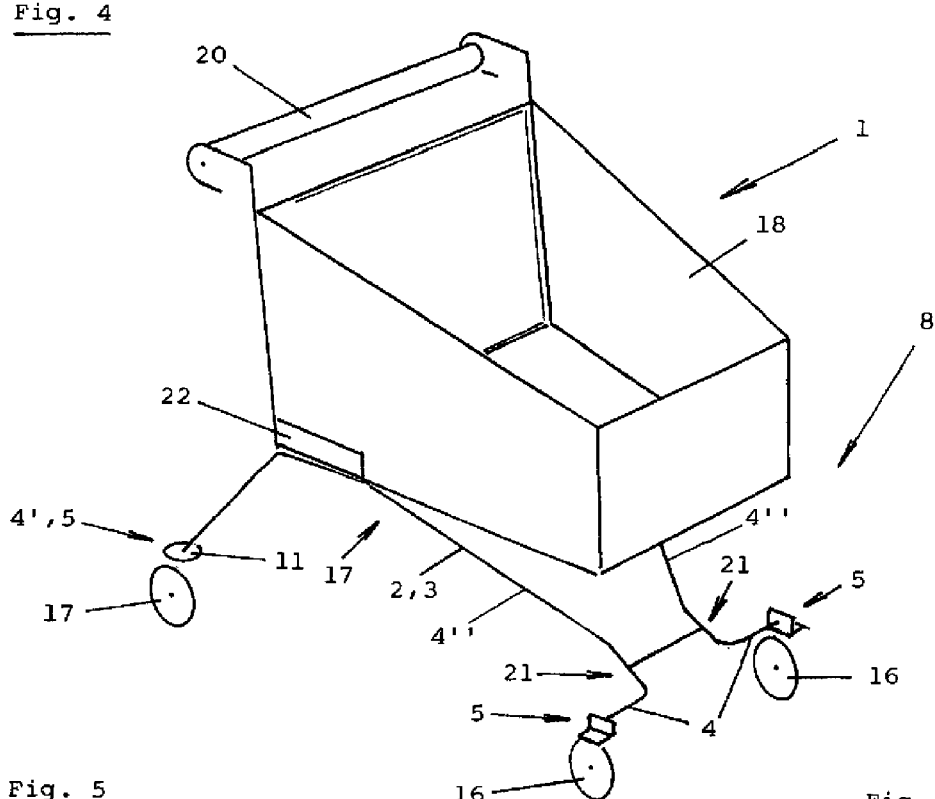
Fig. 4
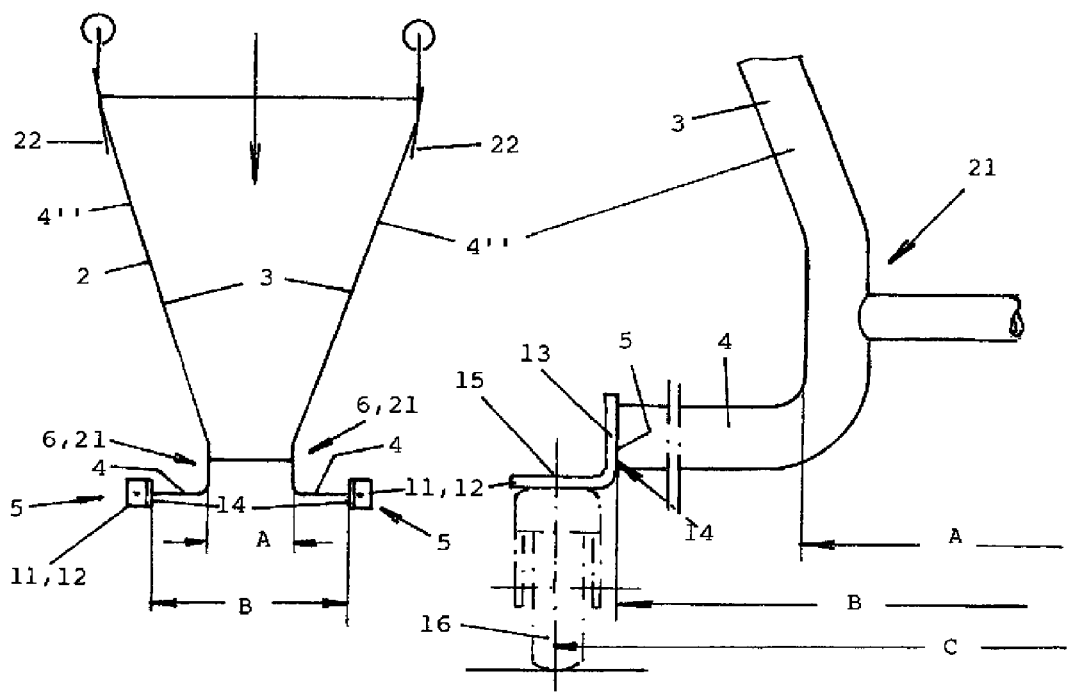
Fig. 5
Fig. 6

SHOPPING TROLLEY

CROSS-REFERENCE TO RELATED APPLICATIONS

This application is a 371 U.S. National Stage of International Application No. PCT/DE2012/000238, filed Mar. 6, 2012, and claims priority to German Patent Application No. 20 2011 003 780.0 filed Mar. 10, 2011, the disclosures of which are herein incorporated by reference in their entirety.

The invention relates to a shopping trolley which is stackable with similar trolleys, having a chassis, having a holding unit for goods which is connected to the chassis, and having a pushing unit located at the rear, wherein the chassis has two curved longitudinal supports leading from the rear side to the front side of the shopping trolley, one fastening means each for fastening a castor being provided at each end of the front and rear end sections of said longitudinal supports, the end sections in each case being connected to one another by an intermediate section, wherein, furthermore, the longitudinal supports are conically arranged such that the track width of the rear castors is larger than the track width of the front castors and wherein the two longitudinal supports, proceeding from their rear end section, extend upward and toward the front and subsequently, inclined downward toward the front, are continued to the front end section such that at least the intermediate section, or the intermediate section and the end section, of each longitudinal support belongs to either of two geometrical planes which, proceeding from the plane of travel of the castors, extend from bottom to top.

The prior art includes the "EL" type shopping trolleys by Wanzl Metallwarenfabrik GmbH in Germany. The chassis of these shopping trolleys has two upwardly curved longitudinal supports which lead toward the front from the rear side of the shopping trolleys and are conically arranged such that the track width of the rear castors is larger than the track width of the front castors. On the upper border of the longitudinal supports, connecting means, which support a basket in a fixed position, are provided in a known manner. The longitudinal supports can be divided into three sections, namely a front end section, which is adjoined by an intermediate section, which leads to a rear end section. At least the intermediate section and the front end section of each longitudinal support here lie in each case on a vertical plane. In many cases, the rear end sections are also located on these planes.

The prior art also includes the "MOVI S" series shopping trolleys by German company J. D. Geck GmbH in Altena, wherein the "MOVI S" series shopping trolleys pursue the aim of decreasing the stacking distance between the individual shopping trolleys stacked in a row, in contrast to the aforementioned "EL" series shopping trolleys, in order to reduce the costs arising in the shipping of shopping trolleys.

The "MOVI S" series shopping trolleys have therefore made use of a known principle, which is evident from U.S. Pat. No. 3,027,174. In the transport trolley described in that document, the two conically arranged longitudinal supports terminate at the front between the front castors, which are located on a transverse strut, such that the front castors are arranged outside the longitudinal supports. On account of this, the angle between the two longitudinal supports is increased, such that these transport trolleys can be stacked more closely than has been possible to date.

Besides the two longitudinal supports, the "MOVI S" series shopping trolleys require the following for the configuration of the front region of the chassis: two relatively large screw-on or bolt-on plates, each directed outward and welded to the longitudinal supports, also a crosspiece which connects the screw-on or bolt-on plates, and a transverse strut which is set back some way and connects the two longitudinal supports. This design outlay gives rise to high production costs.

It is an object of the invention to develop further a shopping trolley of the present type in such a manner that, in contrast to the aforementioned prior art, it is possible to reduce the manufacturing costs of the chassis, and thus the manufacturing costs of the shopping trolley.

The object is achieved as described in the characterizing part of claim 1.

Further advantageous refinements are to be found in the dependent claims.

On account of the proposed solutions, the abovementioned crosspiece connecting the screw-on or bolt-on plates is no longer required. Rather, in an advantageous manner, the front end sections of the two longitudinal supports are extended either parallel to the pushing direction of the shopping trolley or preferably on both sides and in opposite directions from the inside to the outside, such that the front region of the longitudinal supports, aided by the fastening means, assumes the supporting function of the previous crosspiece. The proposed solutions also make it possible in an expedient manner to configure the fastening means for the front castors to be significantly smaller, since these fastening means no longer have to protrude laterally, but reflect the size of the substantially smaller cut surfaces or end surfaces located on the end sections of the longitudinal supports. The manufacturing costs for the chassis of the shopping trolley proposed here can thus be reduced in an advantageous manner as a result of doing away with the crosspiece and of the now smaller fastening means.

A further, very decisive advantage is manifested in that the three proposed possible ways of configuring the front region of the chassis now make it possible to create shopping trolleys which can be stacked so closely in rows that the stacking distance occurring between the shopping trolleys corresponds mathematically to the diameter of the wheels of the castors. This effect is achieved in that, when seen in a plan view of a chassis, at least the intermediate section and the front end section of each longitudinal support is arranged more obliquely than is the case with the "EL" type shopping trolleys from the prior art, mentioned at the outset. On account of this, the longitudinal supports of shopping trolleys parked in a space-saving manner in a row, and thus the chassis of said shopping trolleys, can be nestled more closely than has been possible to date. In this manner, the shipping costs for shipping the shopping trolleys can be significantly reduced, since substantially more shopping trolleys can be placed on a predetermined surface area than has been previously possible. This advantage proves all the more significant, the larger the shopping trolleys are configured.

The invention is explained in more detail by means of a number of exemplary embodiments.

In the drawings:

FIG. 1 shows a first shopping trolley;

FIG. 2 shows a plan view of the chassis of this shopping trolley;

FIG. 3 shows a detail-specific view with reference to FIG. 1 and FIG. 2;

FIG. 4 shows a second shopping trolley;

FIG. 5 shows a plan view of the chassis corresponding to FIG. 4;

FIG. 6 shows a detail-specific view with reference to FIGS. 4 and 5;

Figure 7:
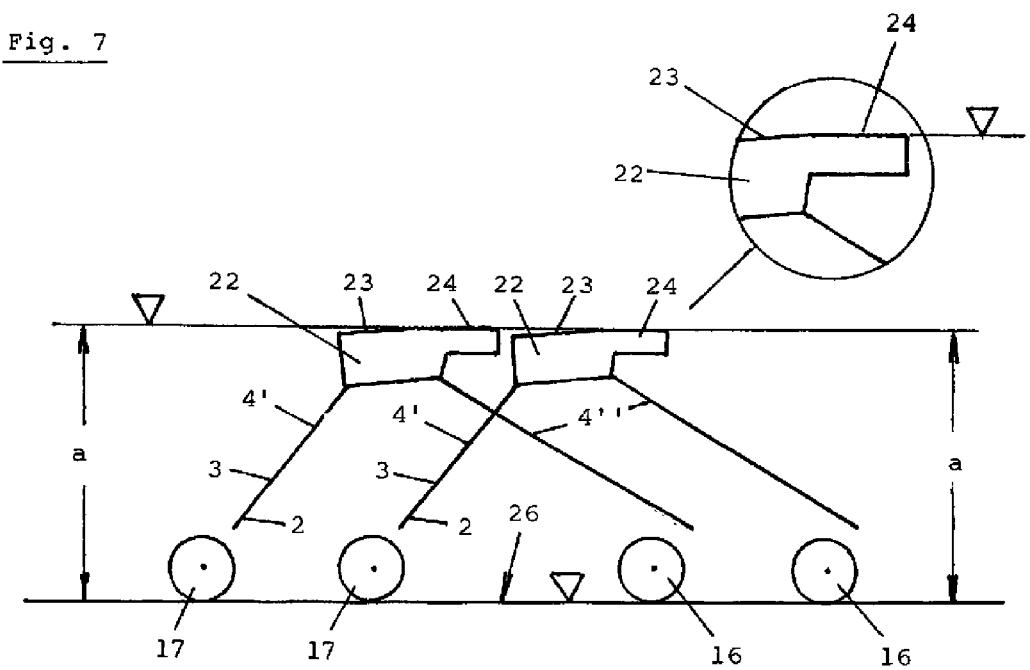
FIG. 7 shows two chassis of a shopping trolley.

FIG. 1 shows a shopping trolley 1 which is configured in a known manner such that it can be pushed in a space-saving manner into a further similar shopping trolley 1, that is to say it can be stacked. The shopping trolley 1 has a chassis 2 which is equipped with front and rear castors 16, 17 and, in a known manner, supports a holding unit for goods 18. This may usually be, and as is also shown in the examples, a basket. In a known manner, a holding device for bags into which goods can be placed during the shopping process is also possible. The holding unit for goods 18 can also be configured in a likewise known manner such that it is suitable for carrying hand-held baskets which are brought along by the customer and placed on the shopping trolley 1. At the rear, a pushing unit 20 is located in a likewise known manner. Known and variously configurable connecting means 22 provide a fixed-position connection between the chassis 2 and the holding unit for goods 18. The chassis 2 has two upwardly curved longitudinal supports 3 which are conically arranged such that, as is likewise known, the track width of the rear castors 17 is larger than the track width of the front castors 16. The two longitudinal supports 3 each have a front end section 4 which is adjoined by an intermediate section 4". The longitudinal supports 3 also have a rear end section 4', to which the intermediate section 4" leads. The front and rear end sections 4, 4' at their free ends terminate in end surfaces 5, on each of which a fastening means 11, for example a flat piece or a thick disk or a round blank, lying flat against an end surface 5, is welded, and thus connected, to a longitudinal support 3. The fastening means 11 usually have a screw-connection bore or a threaded bore 15 for fastening a castor 16, 17. The shopping trolley 1 is, as also shown in FIGS. 2 and 3, schematically illustrated, since in particular for configuring the chassis 2 and the longitudinal supports 3, various tubular and bar-form semi-finished products and other parts which are not described in more detail here may be used in a known manner, round tubing being particular recommended for the two longitudinal supports 3. Each longitudinal support 3 is preferably formed from a single piece of tubing. The front end sections 4 are connected to one another by a transverse strut 9 which is located between the narrowest point 21 of the longitudinal supports 3 and the end surfaces 5; see also FIGS. 2 and 3.

In a plan view, FIG. 2 shows the chassis 2 of the shopping trolley 1 described in FIG. 1. One can identify the two curved longitudinal supports 3, also the transverse strut 9, which is located between the narrowest point 21 and the end surfaces 5 of the longitudinal supports 3, and at least one transverse strut 10, which likewise connects the two longitudinal supports 3, in the rear region 19, and may also be connected to the connecting means 22. On the end surfaces 5 of the front and rear end sections 4, 4' of the longitudinal supports 3, the fastening means 11, which are preferably in the form of plates or round blanks, are provided, onto which the front and the rear castors 16, 17 are fastened. The intermediate section 4" is located between the end sections 4, 4' of each longitudinal support 3. Proceeding from the rear region 19, the two longitudinal supports 3 first extend upward and toward the front, subsequently continue obliquely downward, bend away from one another and continue toward the front from the resulting narrowest point 21, see dimension A, obliquely outward in opposite directions. The shortest distance A measured horizontally between the outer sides 6 of the longitudinal supports 3 here is preferably smaller than the distance B measured horizontally between the inner sides 14 of the fastening means 11 which are located on the front end sections 4 of the longitudinal supports 3 and thus on the end surfaces 5 of the same. "Outward" means leading away from the shopping trolley 1 toward one side in each case, thus in opposite directions.

The front end sections 4 can, if useful, also be directed toward the front parallel to the pushing direction of the shopping trolley 1. Both possible of configurations just described also allow the distance B measured horizontally between the inner sides 14 of the fastening means 11 to be smaller than the shortest distance A measured horizontally at the narrowest point 21 of the longitudinal supports 3. The distances A and B may, however, also be equal.

The detail-specific view according to FIG. 3 shows, when viewed from front to rear, the front region 8 of the left-hand longitudinal support 3 extending from front to rear. One can identify the bend 7, which is located at the narrowest point 21 of the chassis 2, see also FIG. 2, and proceeding from which each of the longitudinal supports 3 arranged in mirror image, and thus each front end section 4, is inclined obliquely downward in an outward direction. It is also possible for the front end sections 4, located on a horizontal plane, to extend in opposite directions obliquely outward. On the end surface 5, the fastening means 11 is welded to the longitudinal support 3. The distances A and B, as described in FIG. 2, are evident by means of the drawing. A front castor 16 is depicted by chain-dotted lines; this is usually a steering castor, which is usually screw-connected to a fastening means 11. The distance C between the vertical pivot axes (16') of the front castors 16, which are configured as steering castors, is larger than the shortest distance A measured horizontally between the outer sides 6 of the longitudinal supports 3, see also FIG. 2.

FIG. 4 shows a further exemplary embodiment of a shopping trolley 1 which is stackable with similar trolleys. With the exception of the front region 8 of the two longitudinal supports 3 of the chassis 2, all the rest of the details can be obtained from the descriptions for FIGS. 1 and 2. While in the shopping trolley 1 according to FIG. 1 the front end sections 4 of the two longitudinal supports 3 extend obliquely outward, in the exemplary embodiment described here, again proceeding from the narrowest point 21, the front end sections 4 of the two longitudinal supports 3 extend in a horizontal arrangement and, transversely to the pushing direction of the shopping trolley 1, in opposite directions away from one another and outward. The front end sections 4 of the two longitudinal supports 3 terminate at the front in a preferably vertical end surface 5, see also FIG. 6.

FIG. 5 shows a plan view of the chassis 2 of the shopping trolley 1 described in FIG. 4. As already described in FIG. 2, the curved longitudinal supports 3, once again, converge conically toward the front, then at the narrowest point 21, see dimension A, bend outward in opposite directions such that the front end sections 4 of the longitudinal spars 3 are arranged transversely to the pushing direction of the shopping trolley 1, see arrow. On the end surfaces 5 of the front end sections 4, fastening means 11 in the form of angles, lying against the end surfaces 5, are welded to said end surfaces 5. The horizontal section 12 of the fastening means 11 has, for example, a screw-connection bore or a threaded bore 15 for the screw-connection of a front castor 16, see also FIG. 6. The drawing, once again, depicts the distance A measured horizontally between the outer sides 6 of the longitudinal supports 3 and the distance B measured horizontally between the inner sides 14 of the fastening means 11. Here, too, the distance A, once again, is preferably smaller than the distance B. Other dimensional ratios are possible; see the description for FIG. 2.

FIG. 6 shows, in detail form, the front end section 4 of the left-hand longitudinal support 3. On the vertical end surface 5, the fastening part 11 in the form of an angle, has its vertical section 13, lying against the end section 5, welded to the longitudinal support 3. On the horizontal section 12 of the fastening part 11, a front castor 16 is illustrated by chain-dotting lines. This detail, separated by the chain-dotting, is drawn as being rotated by 90° into the image plane for the sake of a clearer illustration.

The dimensions A, B and C are additionally depicted in an analogous manner to FIGS. 3 and 5.

FIG. 7 shows two chassis 2 which are used in the described shopping trolleys 1 and have been pushed into one another in a space-saving manner. The two connecting means 22, which are located in a known manner at the top of the longitudinal supports 3, for the sake of clarity are drawn somewhat larger than in reality. The connecting means 22 have, also in a known manner, a shoulder 23 which rises obliquely toward the front and is intended for supporting the holding unit for goods 18, which in the example would be a known basket. Each connecting means 22 now has a surface section 24 which continues toward the front from the shoulder 23 and is arranged horizontally and thus parallel to the plane of travel of the castors 16, 17, cf. the two identical dimensions a. Since not only complete shopping trolleys 1, but also chassis 2, are shipped, for example in containers, the horizontal surface sections 24 of at least two chassis 2 form bearing points for flat material such as, for example, strong cardboard, said bearing points forming a set-down surface for further chassis 2, which therefore can be placed in a space-saving manner onto chassis 2 located underneath.

The drawing allows the two rear end sections 4' and the two intermediate sections 4" of a chassis 2 to be illustrated clearly by way of example. The length of the two rear end sections 4' may be defined as desired. A first possibility allows the length to be defined up to that point at which each longitudinal support 3 changes direction. A second possibility makes it possible, for example, to terminate the length of the rear end sections 4' where the longitudinal supports 3 begin to be inclined downward toward the front.

Figure 8:
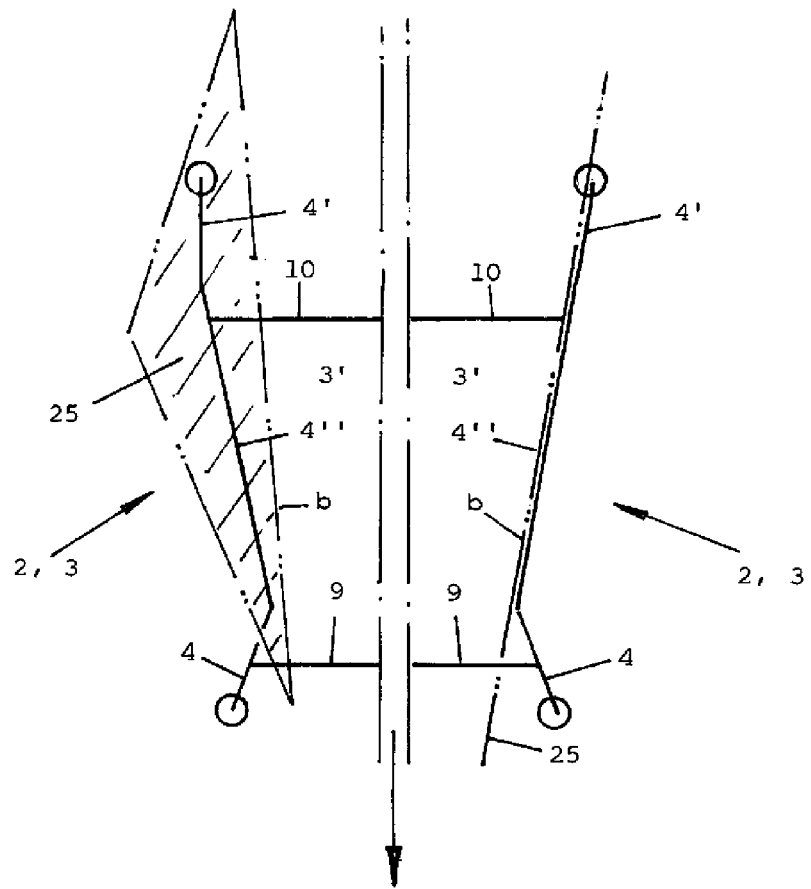
FIG. 8 shows a purely geometrical view taking into account two planes, with reference to the shaping of the two longitudinal supports.

FIG. 8 shows, in a plan view, the left-hand half of the chassis 2 according to FIG. 2 and, as an alternative, the right-hand half of a chassis 2 in which the intermediate section 4" and the rear end section 4' correspond to the prior art. The respectively other half is supplemented in mirror image for each of the two chassis 2, such that in each case one chassis 2 is obtained. Using purely geometrical methods, both exemplary embodiments show the arrangement of a front end section 4, an intermediate section 4" and a rear end section 4' of the longitudinal supports 3. In the longitudinal support 3 illustrated on the left, the rear end section 4' and the intermediate section 4" form a slight bend 7', while in the longitudinal support 3 shown on the right the bend 7' is missing.

A geometrical and thus imaginary plane 25 is depicted or applied on the inner side 3' of the longitudinal support 3 illustrated on the left, and, for example proceeding from the plane of travel 26 of the castors 16, 17, see FIG. 7, extends slightly obliquely in space from the bottom upward. The plane 25, for the sake of clarity, is drawn as a triangle, wherein the line marked b also belongs to the plane of travel 26. One can identify in the drawing that the rear end section 4' and the intermediate section 4" are constituent parts of the plane 25 illustrated on the left. It is also possible here to dispense with the rear end section 4' as a constituent part of the plane 25 when the intermediate section 4" has, for example, a curved or angled shape by which a plane, in the present case this being the plane 25, can be geometrically defined.

On the inner side 3' of the longitudinal support 3 which is illustrated on the right and has no bend 7', and thus extends in a straight line, a geometrical and thus imaginary plane 25 has likewise been depicted or applied, and this plane, proceeding from the plane of travel 26 of the castors 16, 17, is arranged vertically in space and leads from the bottom upward. On account of the vertical arrangement of the plane 25, the latter is shown, in the selected plan view, only as a chain-dotted line. The line b is thus congruent with the chain-dotted line. One can identify by means of the illustration that the rear end section 4' and the intermediate section 4" of the longitudinal support 3 illustrated on the right are constituent parts of the plane 25 illustrated on the right. It applies here, too, that it is possible to dispense with the rear end section 4' as a constituent part of the plane 25 when the intermediate section 4", on account of a curved or angled shape, is able to define a plane geometrically, in the present case this being the plane 25.

It is thus possible to apply to each of the two chassis 2 two planes 25 which converge on one another in the pushing direction (see arrow) of the shopping trolley 1, it being irrelevant whether the intermediate sections 4" and the rear end sections 4' lie against the planes 25 in a flat or punctiform manner.

It is clearly evident from the drawing that in both exemplary embodiments the front end sections 4 of the two longitudinal supports 3 of each shopping trolley 1 extend out of the planes 25, the front end sections 4 either being arranged horizontally or being inclined downward toward the front.

The invention claimed is:

1. A shopping trolley which is stackable with similar trolleys, comprising:
  a chassis having a holding unit for goods which is connected to the chassis; and
  a pushing unit located at a rear side of the shopping trolley, wherein the chassis further includes:
    two curved longitudinal supports leading from the rear side to a front side of the shopping trolley, wherein each longitudinal support is a separate, continuous piece having a front end section and a rear end section;
    an end surface of the front end section and an end surface of the rear end section being provided each with a fastening means for fastening a front castor and a rear castor;
  the longitudinal supports are arranged at angles, such that a track width of the rear castors is larger than a track width of the front castors, and
  the two longitudinal supports, proceeding from the rear end section, extend upward and toward the front side of the shopping trolley and subsequently, extend downward and toward the front side of the shopping trolley, wherein the two longitudinal supports continue from the rear end section to the front end section;
  the front end sections either
    extend toward the front side of the shopping trolley and parallel to a pushing direction of the shopping trolley, or
    extend in opposite directions obliquely toward the front side of the shopping trolley and outward, or
    are directed outward transversely to the pushing direction of the shopping trolley.

2. The shopping trolley as claimed in claim 1, wherein the front end sections are either inclined downward toward the front or located on a horizontal plane directed outward.

3. The shopping trolley as claimed in claim 1, wherein the front end sections, proceeding from a narrowest point formed by the longitudinal supports, are directed toward the front or outward.

4. The shopping trolley as claimed in claim 1, wherein a shortest distance measured horizontally between outer sides of the longitudinal supports is at least one of smaller than a distance measured horizontally between inner sides of the fastening means, and smaller than a distance measured horizontally between vertical pivot axes of the front castors, which are configured as steering castors.

5. The shopping trolley as claimed in claim 1, wherein the front end sections are connected by a transverse strut which is located between the narrowest point and the end surfaces.

6. The shopping trolley as claimed in claim 1, wherein the fastening means on each front end section is located on a horizontal or vertical end surface.

7. The shopping trolley as claimed in claim 1 wherein the fastening means are formed in the form of plates or angles.

8. The shopping trolley as claimed in claim 1, wherein the longitudinal supports are formed from round tubing.

9. The shopping trolley as claimed in claim 1, wherein a plurality of connecting means connect the holding unit for goods to the chassis, each of the plurality of connecting means supporting the holding unit for goods has a horizontal surface section, and when a plurality of shopping trolleys are stacked together, the surface sections of at least two chassis of the plurality of shopping trolleys provide a plurality of load-bearing points for flat material.

10. The shopping trolley as claimed in claim 9, wherein the horizontal surface sections are arranged horizontally and parallel to the plane of travel of the castors.

11. The shopping trolley as claimed in claim 1, wherein the front end section and the rear end section are connected to one another by an intermediate section.

\* \* \* \* \*